Aug. 28, 1951  D. B. KENDALL ET AL  2,566,210
ELECTRICAL CONTROL TO MOMENTARILY REVERSE
FEEDER AT CUTOFF
Filed Oct. 2, 1948  2 Sheets-Sheet 1
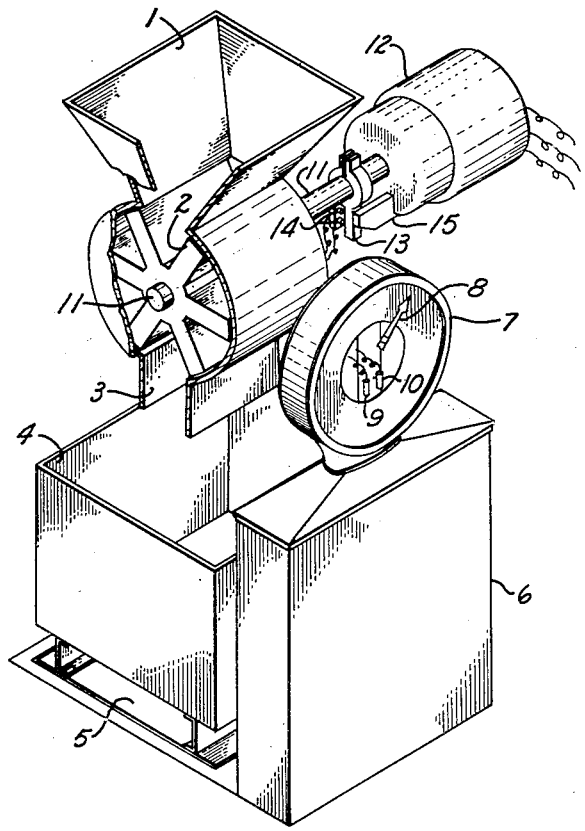
_Fig_I
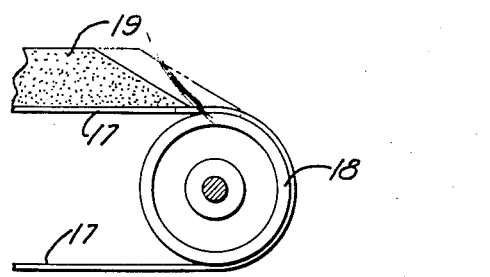
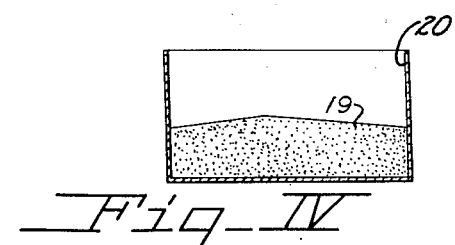
_Fig_IV
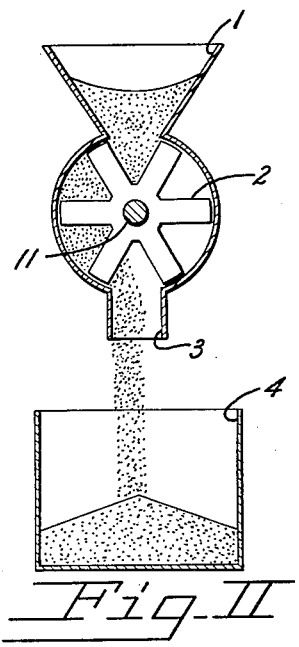
_Fig_II
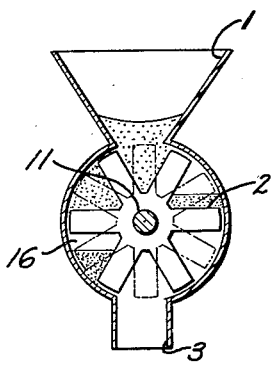
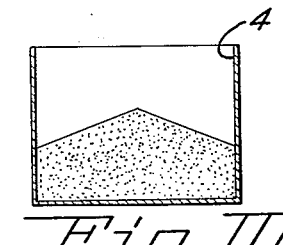
_Fig_III
INVENTOR.
DONALD B. KENDALL
ROBERT O. BRADLEY
BY
Marshall, Marshall & Leonard
ATTORNEYS

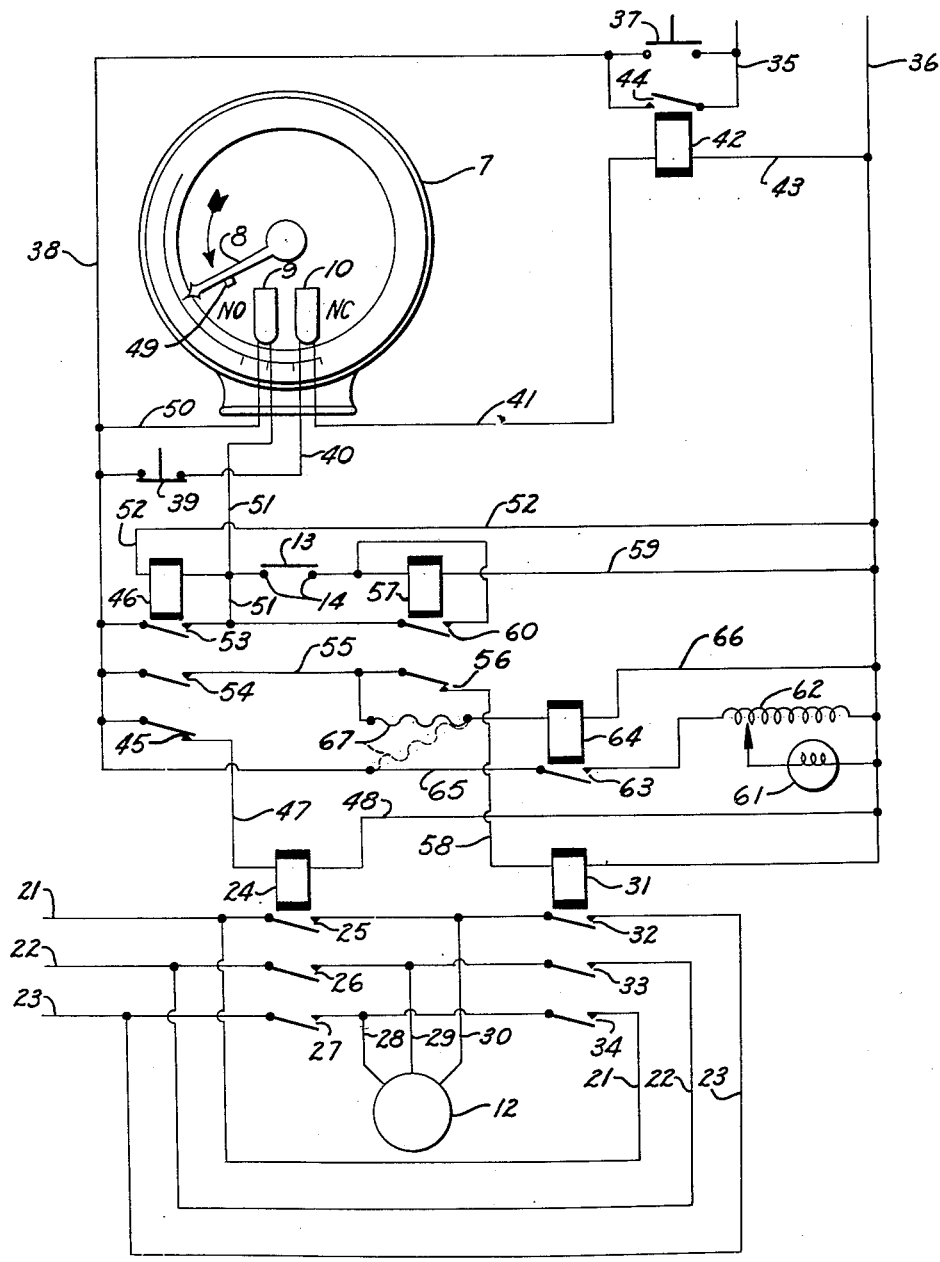
Fig V
INVENTOR.
DONALD B. KENDALL
ROBERT O. BRADLEY

Patented Aug. 28, 1951

2,566,210

UNITED STATES PATENT OFFICE 2,566,210

ELECTRICAL CONTROL TO MOMENTARILY REVERSE FEEDER AT CUTOFF

Donald B. Kendall and Robert O. Bradley, Toledo, Ohio, assignors to Toledo Scale Company, Toledo, Ohio, a corporation of New Jersey Application October 2, 1948, Serial No. 52,578

4 Claims. (Cl. 198—39)

This invention relates to material feeding apparatus and in particular to the control of a feeder that rapidly feeds material into a container supported by a weighing scale mechanism.

Many processes and the packaging of many materials require that the flow of material into a receptacle be accurately controlled according to the weight of the material accumulated in the receptacle. In such operations it is customary to employ two feeders one of which feeds material rapidly and which is stopped shortly before the desired weight is accumulated and another of which is operated or continues to operate after the fast feeder is stopped and which slowly feeds material into the container until the exact weight is reached. This system of filling a container with two feeders is widely used.

There are some instances in which this system is not entirely satisfactory. For example, vane feeders, conveyor belt feeders, and other similar types of feeders when employed as a fast feeder are not entirely satisfactory because such a feeder may continue after it is shut off to dribble some material into the weighing receptacle and thus disturb the control for the slow speed feeder or actually cause an overweight of material to be accumulated before the flow of material is entirely stopped.

The principal object of this invention is to provide a control suitable for use with a vane type feeder, a conveyor feeder or any similar type of feeder which control operates the feeder in a manner such that the dribbling after the feeder stops is completely eliminated.

Another object of the invention is to provide a control which actually reverses the direction of travel of a feeder through a small increment of distance whereby all material in the feeder is effectively removed from the discharging position.

A further object of the invention is to provide a feeder motor control that energizes the feeder motor for reverse rotation following the attainment of the approximate weight of material and maintains reverse energization upon the motor until the motor actually stops and starts to rotate in the reverse direction.

More specific objects and advantages are apparent from the following description of a preferred embodiment of the invention.

According to the invention, a reversible motor is employed to drive the material feeder and the motor is controlled through the cooperation of a pair of switches the first of which is actuated by the accumulation of material in the weighing container and which reverses the energization of the motor and the second of which is actuated by reversal of rotation of the motor to completely de-energize the motor immediately following such reversal. Upon such reversal the motor rotates in the reverse direction a short distance that is sufficient to reverse the feeder and thus remove all material from the discharge position.

Preferred embodiments of the invention are illustrated in the accompanying drawings.

In the drawings:

Figure I is an isometric view of a vane type feeder employed to feed material into a container supported on a weighing scale.

Figures II and III are schematic end elevations, partly in section, to show the operation of the feeder illustrated in Figure I.

Figure IV is a diagrammatic representation of the discharge end of a belt conveyor arranged to operate according to the invention.

Figure V is a schematic wiring diagram of the improved motor control system.

These specific figures and the accompanying description are intended merely to illustrate the invention but not to impose limitations on the claims.

Referring to Figure I, the material to be accumulated in batches of predetermined weight is fed to a hopper 1 from which it is drawn by a vane or star wheel feeder 2 and discharged through a downwardly directed spout 3 into a container 4 mounted on the load receiver 5 of a weighing scale. The load counterbalancing and indicating mechanism of the weighing scale is included in a cabinet 6 and dial housing 7. An indicator 8 within the dial housing rotates to indicate the magnitude of the load accumulated in the container 4 and is arranged to operate a pair of mercury magnetic switches 9 and 10 successively as the load in the container approaches the desired weight and finally reaches the desired weight.

The vane type feeder 2 is carried on a shaft 11 which in turn is driven by a motor 12. A zero speed switch 13 has a movable member carried on and frictionally driven by the shaft 11 and has a pair of contacts 14 that are normally open and that are closed as soon as the motor rotates through a small angle in a reverse direction. A stop 15 shown mounted from the frame of the motor 12 limits the forward motion of the movable member 13 of the switch.

Referring to Figures II and III, the material is fed from the hopper 1 through the feeder and out the discharge spout 3 by counterclockwise rotation of the feeder vanes 2 as seen in these figures. As each of the vanes 2 passes the bottom of the hopper 1 a quantity of material is collected in the pocket between the vanes and is carried around and then discharged through the downwardly directed spout 3 and collected in the container 4. When the feeder is operating at normal speed the discharge of material is substantially continuous even though it passes through the feeder in discrete volumes determined by the volume of the pockets between the vanes. As the weight of material in the container 4 approaches the desired amount and the indicator 8 reaches the first of the mercury magnetic switches 9, it generates a signal for stopping the motor 12 and thus stopping the flow of material. Without additional control it may well happen that the vane feeder 2 would stop in the position shown by the dot-dash lines of Figure III and that in such position, since only a small opening to the discharge passage 3 exists, the material would dribble slowly from the feeder into the material container 4. Since such dribbling could easily continue for a time interval greater than that required for a slow speed feeder to complete the filling to the desired weight and thus cause an overweight in the batch, it is necessary to prevent such dribbling flow. According to the invention, this is accomplished by causing the feeder to reverse a fraction of a revolution when it is called upon to stop and, by thus reversing, to move any partially discharged pocket into the position occupied by the pocket 16 of Figure III. Since by reversal the pocket is removed from its discharge position and since the pockets on the other side of the feeder, which are normally moving upwardly, are empty the reversal places an empty pocket over the discharge passage 3 and thus effectively prevents any further dribbling of material.

The same dribbling action from a feeder that is stopped without reversal may occur in a belt conveyor, a bucket elevator or, in fact, practically any feeder that operates by transporting discrete quantities of material or with a heavy burden. With any such feeder it is necessary to reverse it far enough so that an empty portion of the conveyor is left standing at the discharge position.

Referring to Figure IV, a conveyor belt 17 running over an end pulley 18 carries a load of material 19 that is discharged into a container 20. When such a conveyor is operating at normal speed the angle of repose of the material on the end of the conveyor is quite steep. When the conveyor stops without reversal the angle of repose changes from its steep condition to a relatively shallow or sloping condition as the material dribbles over the end of the conveyor and into the container 20. According to the invention, this dribbling condition is eliminated by reversing the feeder far enough so that the material can assume its normal slope or angle of repose without any of the material running over the end of the conveyor.

The control for operating the motor 12 according to the signals received from the mercury magnetic switches 9 and 10 and the zero speed switch 13 is schematically illustrated in Figure V. As seen in this schematic diagram, the motor 12 was supplied with power from a three-phase source through leads 21, 22 and 23. When the motor is to be operated in a forward direction to feed material a relay coil 24 is energized to close its contacts 25, 26 and 27 thereby connecting motor leads 28, 29 and 30 to the supply leads 23, 22 and 21 respectively. When the motor is to be stopped and reversed the relay coil 24 is de-energized and a second relay coil 31 is energized to close its contacts 32, 33 and 34 which connect the motor leads 28, 29 and 30 to the power leads 21, 22 and 23 respectively. Since the leads are connected in reverse order when the relay coil 31 is energized, the motor is energized for reverse rotation so that it is quickly stopped and if the relay coil 31 is not immediately de-energized the motor rotates in the opposite direction.

The relay coils 24 and 31 are actuated by a control circuit that includes the mercury magnetic switches 9 and 10 and the motor zero speed switch 13. This control circuit is fed with control power through a pair of leads 35 and 36 of which the lead 36 may be considered a return line and would normally be grounded.

Starting with the circuit completely de-energized and with an empty container on the scale a weighing operation is started by depressing a start button 37 so that current may flow from the control power lead 35 through the now closed start switch 37, a lead 38, a normally closed stop switch 39, a lead 40, the normally-closed mercury-magnetic switch 10 in the dial housing and a lead 41 connected to a relay coil 42 the other side of which is connected through a lead 43 to the grounded or return lead 36. Current flow through this circuit causes the relay coil 42 to close its holding contacts 44 which being connected in parallel with the start switch 37 maintain power on the lead 38 even though the start switch 37 is released.

As soon as the lead 38 is energized either through the start switch 37 or the relay contacts 44 current flows through normally-closed contacts 45 operated by a relay coil 46. The relay coil 46 is not energized at this time. The normally-closed contacts 45 are connected through a lead 47 to the first relay coil 24 the other side of which is connected through a lead 48 to the return lead 36. Since the relay 24 operates the feeder motor 12 in a forward direction, the flow of material through the container is started or established as soon as the start switch 37 or contacts 44 are closed.

The feeder motor operates to feed material into the weighing container until a magnet 49 carried on the weighing scale indicator 8 approaches the normally-open mercury-magnetic switch 9 and causes it to close its contacts. As the switch 9 closes its contacts it completes a circuit from the lead 38 through a lead 50, its contacts, a lead 51 and the relay coil 46 the other side of which is connected through a lead 52 to the return lead 36. The relay coil 46 thus energized immediately closes its contacts 53 and 54 the contacts 53 being in parallel with the mercury magnetic switch 9 and serving to maintain current flow to the relay coil 46 after the magnet 49 has left the switch 9.

The now closed contacts 54 supply current through a lead 55, normally closed contacts 56 of a relay 57, and a lead 58 to the relay coil 31 controlling the reverse energization of the motor 12. The other side of the relay coil 31 is connected to the return lead 36. When the relay coil 46 was energized to close its contacts 53 and 54 it also opened its normally closed contacts 45 thus breaking the circuit to the relay coil 24 so that it immediately opened its contacts to disconnect the motor 12 from the line. The relays 24 and 31 are preferably mechanically interlocked so that they can not close simultaneously. This mechanical interlocking is necessary because upon operation of the relay 46 the relay coil 31 is energized before the relay 24 has time for its contacts to drop out or open. The mechanical interlocking delays the closure of the contacts 32, 33 and 34 until after the opening of the contacts 25, 26 and 27.

When the relay 31 was energized by operation of the normally-open mercury-magnetic switch 9 and the motor was thereupon energized through the relay 31 for reverse rotation, it rapidly decelerates, stops and starts to reverse. As soon as it completes a fraction of a turn in reverse the friction driven zero speed switch 13 closes its contacts 14 thereby completing a circuit from the now energized lead 51 through the coil of the relay 57 and lead 59 to the return or grounded lead 36. The relay 57 thereupon closes its normally open contacts 60 to complete a shunt circuit or sealing circuit around the zero speed switch 13 and at the same time opens its normally-closed contacts 56 to de-energize the relay 31 and thus disconnect the motor 12 from the power line. The motor 12 thereupon quickly coasts to a stop but not before it has driven the feeder backwards far enough to remove any loaded portions of the conveyor from the discharge position.

A drive 61 for a slow speed feeder is connected to a variable transformer 62 which in turn is connected through contacts 63 of a relay 64 to an extension 65 of the lead 38. The relay coil 64, one side of which is connected through a lead 66 to the return lead 36 is connected through a jumper 67 to either the lead 55 or the lead 65. If the jumper is connected to the lead 65 the slow speed feeder operates as long as the lead 38 is energized. If the jumper is connected to the lead 55 the slow speed feeder is energized as long as the lead 38 and the relay 46 are energized. In either case the slow speed feeder operates after the motor 12 has been stopped and serves to add material into the weighing container until the magnet 49 on the weight indicator 8 reaches the normally-closed mercury-magnetic switch 10. When the magnet 49 reaches this switch and opens its contacts it breaks the circuit to the holding relay 42 which relay by opening its contacts deenergizes the complete control system thereby stopping the slow speed feeder as well as de-energizing all the control relays.

This control circuit provides the desired operation of the feeder motor inasmuch as the motor 12 is connected for forward rotation until the correct weight is approached, then the motor is thrown into reverse and held energized for reverse rotation until it comes to a stop and moves backward through a small distance. A small reverse rotation initiates a relay operation involving the relay 57 and the relay 31 the first of which must pick up and the second of which must drop out to de-energize the motor. During the time required for these relays to operate the motor is accelerating in a reverse direction from its point of reversal. As soon as the relay 31 drops out the motor is de-energized and the kinetic energy is then expended to overcome friction in the conveyor which friction quickly brings the motor to rest. In any event the conveyor is reversed far enough so that any loaded portions thereof are removed from their discharge position.

Various modifications of the structure may be made without departing from the spirit and scope of the invention.

Having described the invention, we claim:

1. In a weight controlled feeder, in combination, a feeder having a moving carrier adapted to discharge into a receiver, a reversible motor for driving the feeder, means for energizing the motor to drive the feeder, a source of signals for stopping the feeder, means responsive to said source of signals for energizing the motor for reverse rotation, and means actuated by reversal of the motor for de-energizing the motor, whereby the feeder is reversed sufficiently to prevent dribbling discharge from the feeder.

2. In a weight controlled feeder, in combination, a feeder having a moving carrier adapted to discharge into a receiver, a reversible motor for driving the feeder, a switch for signalling a change in the direction of rotation of the motor, means for energizing the motor to drive the feeder, a source of signals for stopping the feeder, and means jointly controlled by said signals and said switch for energizing the motor for reverse rotation until it starts to rotate in reverse, whereby the feeder is reversed sufficiently to remove any partially discharged portion from its discharging position.

3. In a weight controlled feeder, in combination, a feeder having a moving carrier adapted to discharge into a receiver, a reversible motor for driving the feeder, a first contactor for energizing the motor in a forward direction, a second contactor for energizing the motor in reverse, means responsive to the quantity of material accumulated in the receiver for de-energizing the first contactor and energizing the second contactor, and a switch responsive to a change in the direction of rotation of the motor for de-energizing the second contactor.

4. In a weight controlled feeder, in combination, a feeder having a moving carrier adapted to discharge into a receiver, a reversible motor for driving the feeder, a first contactor for energizing the motor in a forward direction, a second contactor for energizing the motor in a reverse direction, a first relay that is actuated when a desired quantity of material has been discharged into the receiver, said relay actuating the first contactor when in an unactuated position and actuating the second contactor when in its actuated position, a second relay that is equipped with holding contacts and that has contacts which when operated break the circuit to the second contactor, and a switch operated by reversal of the motor for closing the second relay.

DONALD B. KENDALL.
ROBERT O. BRADLEY.

REFERENCES CITED

The following references are of record in the file of this patent:

UNITED STATES PATENTS

| Number | Name | Date |
|---|---|---|
| 2,232,545 | Lum | Feb. 18, 1941 |
| 2,384,385 | Madeira | Sept. 4, 1945 |